United States Patent [19]

Barbieri et al.

[11] 3,985,450

[45] Oct. 12, 1976

[54] COLOR FILTER DETERMINING APPARATUS WITH INDICATION OF THE COLOR COMPONENTS TO BE BALANCED

[75] Inventors: Siegfried Barbieri, Brixen; Franz Obertegger, Meran, both of Italy

[73] Assignee: Durst AG Fabrik Fototechnischer Apparate, Bozen, Italy

[22] Filed: Sept. 23, 1975

[21] Appl. No.: 616,084

[30] Foreign Application Priority Data

Oct. 2, 1974 Italy .................................. 4903/74

[52] U.S. Cl. .................................. 356/175; 355/38; 356/178

[51] Int. Cl.[2] ...................... G01J 3/46; G01B 27/78

[58] Field of Search .................... 356/175, 178, 195; 250/214 P; 355/38

[56] References Cited

UNITED STATES PATENTS 3,819,275 6/1975 Aimi et al. ......................... 356/175

*Primary Examiner*—Vincent P. McGraw

*Attorney, Agent, or Firm*—Connolly and Hutz

[57] ABSTRACT

A color filter-determining apparatus, which indicates the color component to be balanced, has two measuring circuits, each of which contains a pair of photoelectric transducers. One of the photoelectric transducers in each measuring circuit is sensitive to the same primary color and the other transducers are sensitive to different primary colors. The measuring circuits comprise resistance measuring bridges, which are complemented by resistors and diagonally supplied by separate power sources and also diagonally connected to inputs of operational amplifiers, such as sum-and-difference amplifiers.

10 Claims, 1 Drawing Figure

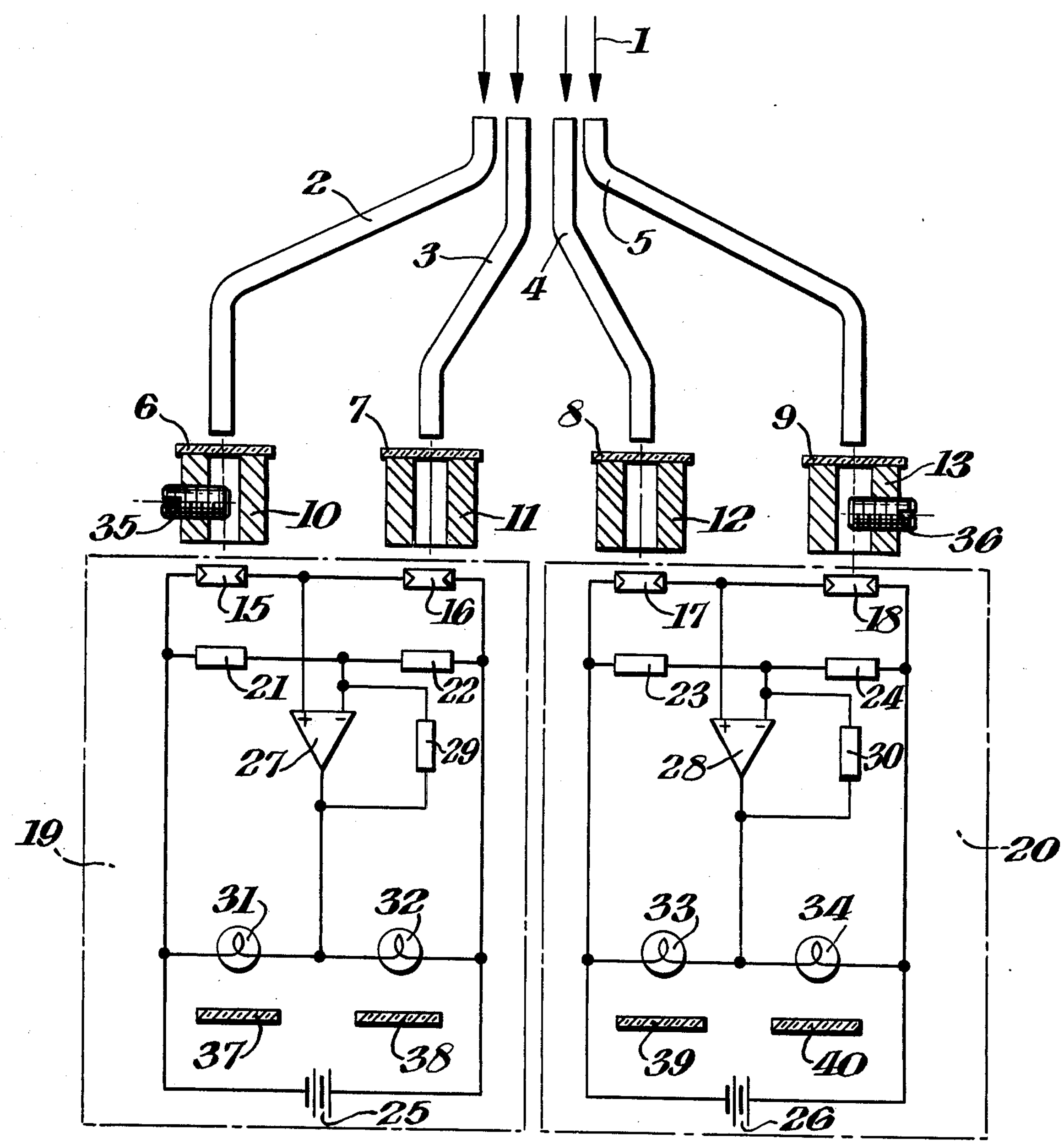
1
2
3
4
5
6
7
8
9
10
11
12
13
35
36
15
16
17
18
21
22
23
24
27
28
29
30
19
20
31
32
33
34
37
38
39
40
25
26

COLOR FILTER DETERMINING APPARATUS WITH INDICATION OF THE COLOR COMPONENTS TO BE BALANCED

BACKGROUND OF THE INVENTION

This invention relates to a color filter determining apparatus with indication of the color components to be balanced.

The determination of the color filtration of the copying light necessary for the copying of color negatives is frequently accomplished by color filter-determining apparatus whose measuring principle is based upon measurement of the reciprocal proportions of the primary color constituents in the color negative to be copied, — photoelectric transducers, usually photoconductive cells, being employed as the measuring receivers, forming a branch of a measuring bridge or of a compensating circuit.

In the processing of a series of color negatives, there usually do not occur any excessive changes in the filtration, necessary for color cast-free copying, of one color negative to the next, so that often only the filter values of a single primary color need be changed. For an acceleration of the filter-determining process, it is therefore advantages if the color filter-determining apparatus contains an indicator which shows which of the three primary color components has to be balanced.

German Pat. No. 1,472,610 describes a color filter-determining apparatus wherein three spectrally differently sensitive photoconductive cells, inserted into the copying light beam, are connected within a resistance-compensating circuit, wherein the changes in resistance of the photoconductive cells caused by the effects of light are balanced by respective rotary potentiometers, whose positions depict the measure of color filtration necessary for the copying process. By means of a periodically reversing electromagnetic switch, the tap of a rotary potentiometer may be intermittently connected with one of the two zero indicators each, which in turn are in contact with a tap each of the two other rotary potentiometers. The indicating condition of the zero indicators prior to the balancing gives a clear indication of the filter color which must be balanced, since in both switch positions, the relationship of two primary color constituents to each other is indicated.

This known color filter determining apparatus has, however, the drawback that the color balance of the two equalized primary colors (in the example: blue to red or blue to green) cannot be adjusted independently for both color groups, which reduces the operating flexibility of the apparatus. For example, the setting of the potentiometer pertaining to the primary reference color may be such that an equalization can no longer be accomplished by balancing the potentiometer pertaining to another primary color, but instead is possible only by adjusting the first potentiometer pertaining to the primary reference color, which again changes the balance of the other color group which possibly has been already previously equalized. Thus, it may occur that the balancing of both color groups can be attained only after performing several steps.

With such apparatus, the necessity of periodically reversing the electromagnetic switch between the two zero indicators also has a detrimental effect, because it influences to a great degree the cost of manufacture of the apparatus. A further drawback of such known apparatus is that the individual photoconductive cells are energized at different operating points, determined by calibrating resistors, so that their different time constants become noticeable by a jump in brightness.

An object of this invention is to provide a color filter determining apparatus with an indication of the color components to be balanced, which enables an equalization of the two primary color proportions independent of each other and wherein the above-mentioned drawbacks are avoided.

SUMMARY

Such object, with a color filter-determining apparatus with indication of the color components to be balanced, is solved in that two separate measuring circuits are provided having at least two photoelectric transducers each, of which at least two are sensitive to the same primary color and are connected to the two measuring circuits in such a manner that each measuring circuit contains at least one of the photoelectric transducers, which is sensitive to the same primary color.

By the distribution of the measuring circuit, an independent adjustment of the color balance of both color groups is afforded. In addition, the novel arrangement substantially removes the influence of the time constant of the individual photoelectric transducers to cause a jump in brightness because they are always energized at the same operating point.

BRIEF DESCRIPTION OF THE DRAWING

Novel features and advantages of the present invention will become apparent to one skilled in the art from a reading of the following detailed description in conjunction with the accompanying drawings wherein similar reference characters refer to similar parts and in which:

The single FIGURE of drawing represents a novel color filter determining apparatus in a schematic manner, which is one embodiment of this invention.

DESCRIPTION OF THE PREFERRED EMBODIMENT

In the copying light beam 1 of a copying apparatus, not illustrated in more detail, there are inserted four photoconductors, such as fiber optics 2, 3, 4, 5 each having attached to its outlet light surface a color filter, respectively 6, 7, 8, 9. Each individual one of these color filters is connected with a light passageway 10, 11, 12, 13. Each light passageway in turn is directed at a photoelectric transducer, e.g. a photoconductive cell 15, 16, 17, 18. Of the color filters 6, 7, 8, 9, the color filters 6 and 9 are permeable by the same primary color, while color filters 7 and 8 are permeable by different primary colors different from the first primary color so that the individual photoconductive cells are different and are sensitive to the three primary colors accordingly. For example, photoconductive cells 15 and 18 respond to the red primary color, photoconductive cell 16 responds to the blue primary color, and photoconductive cell 17, by the respective filter selection, responds to the green primary color. Each two photoconductive cells 15, 16, or 17, 18, which are sensitive to a different primary color, form adjacent branches of two separate resistance measuring bridges 19, 20, which are complemented by suitable resistors 21, 22 or 23, 24 and are diagonally fed by one power source 25 or 26 each, while the terminals of the other diagonal are connected to the inputs of an operational amplifier 27 or 28 each, used as sum-and-difference amplifiers. In the negative feed-back branches are situated a resistor 29 or 30 each, which, together with the resistors 21, 22 or 23, 24, determine the particular amplification factor of the sum-and-difference amplifiers 27 or 28. In order to make certain that the individual photoconductive cells are always energized at the same operating point, the ohmic values of resistors 21, 22 or 23, 24 are selected to be equally high, preferably within the particular measuring bridge.

The outputs of the two operational amplifiers 27, 28 are connected in a known manner with two indicator lamps 31, 32 or 33, 34 each, which forms one light balance each and in this manner indicate the balancing state of the two measuring bridges. With an adjusted measuring bridge, the particular lamps shine simultaneously and with the same intensity.

At any given time at least one of the light channels 10 or 13, pertaining to both measuring bridges 19 or 20, is covered by diaphragms insertable in the light channels in a continuous manner, these diaphragms being provided for example, by screws 35 or 36 insertable into the particular light passageway.

In the equalization of the apparatus, during which time a test negative with typical color distribution is situated in the light beam of the copying apparatus, both diaphragms are inserted into the particular light passageway 10 or 13 in such a manner that both measuring bridges 19, 20 are balanced. If the test copy is subsequently substituted by a color negative to be copied, the color filters are inserted into the optical path ahead of the color negative in such a manner that both measuring bridges are equalized. In this connection, the lamps of both light balances lighting up more sharply, depending on the compensation direction of the measuring bridge, indicate in which filter colors a filtration is to occur.

In the sensitivity arrangement of the individual photoconductive cells further described above, the relationship of the red to the blue primary color is indicated by measuring bridge 19 and the relationship of the red to the green primary color is indicated by measuring bridge 20. If the copying process occurs in accordance with the subtractive color mixing process, lamps 31 and 33 indicate a required cyanine filtration; lamp 32, a required yellow filtration; and lamp 34, a required magenta filtration. Placed before the individual lamps 31, 32, 33, 34 may be filters 37, 38, 39, 40 whose filter colors correspond to the just mentioned complementary colors, so that an immediate indication is given of the colors in which a filtration is necessary, something which is advantageous particularly in working in a darkroom. Such a color indication may also take place by means of luminous diodes with respective spectral emmision, replacing lamps 31, 32, 33, 34, in which case the color filters 37, 38, 39, 40 may be eliminated. With a sufficiently great amplification factor of the operational amplifiers 27 and 28, only one of the two lamps in each measuring circuit lights up upon an insignificant adjustment of the particular measuring bridge, so that it is not necessary to evaluate exactly the intensity differences of both lamps in order to obtain an exact indication of the balancing conditions of the measuring bridge.

Both measuring bridges may also be equalized by potentiometers instead of by the use of diaphragms in the light passageways, the potentiometers entirely or partially replacing resistors 21, 22, 23, 24, in which case the position of the individual potentiometers represents a measure for the filtration in the filter color pertaining to the particular potentiometer.

The number of the photoelectric transducers is not limited to the four photoconductive cells shown in the exemplary embodiment. In many instances it is suitable to increase the number of the photoelectric transducers pertaining to one primary color, particularly if the photoelectric transducers are less sensitive to one particular primary color than to another.

We claim:

1. A color filter-determining apparatus for photographic printing light, which indicates the color components to be equalized, comprising two separate measuring circuits, at least two photoelectric transducers in each measuring circuit, at least one of the transducers in each measuring circuit being sensitive to the same primary color, light-channeling means disposed between the printing light and the transducers for directing the printing light upon the transducers, each measuring circuit contains a light balance with two visual indicating means, one of the two visual indicating means in each measuring circuit is correlated with the one each of the photoelectric transducers sensitive to the same primary color whereby independent adjustment of the color balance affected by each measuring circuit is afforded.

2. A color filter-determining apparatus in accordance with claim 1 wherein a separate optical path is connected from the printing light to each of the photoelectric transducers.

3. A color filter-determining apparatus in accordance with claim 1 wherein the measuring circuits comprise resistance bridges, the resistance bridges having two adjacent branches containing photoconductive cells as the photoelectric transducers, and the photoconductive cells in each branch of a measuring circuit being sensitive to a different primary color.

4. A color filter-determining apparatus in accordance with claim 3 wherein the resistance measuring bridges are supplemented by resistors connected in branches not incorporating the photoconductive cells, and the ohmic values of the resistors in the adjacent branches being equal to each other.

5. A color filter-determining apparatus in accordance with claim 3 wherein at least one of the branches of the resistance measuring bridges not incorporating a photoconductive cell contains a potentiometer.

6. A color filter-determining apparatus in accordance with claim 1 wherein that the color filter whose color is complementary to the primary color, wherefor the corresponding photoelectric transducer is sensitive, is disposed in front of each of the visual indicating means.

7. A color filter-determining apparatus in accordance with claim 2 wherein the separate optical paths contain photoconductors.

8. A color filter-determining apparatus in accordance with claim 2 wherein at least two of the separate optical paths include diaphragms for adjusting the amount of light passing through them.

9. A color filter-determining apparatus in accordance with claim 1 wherein the visual indicating means each comprise indicating lamps.

10. A color filter-determining apparatus in accordance with claim 1 wherein the two visual indicating means in one measuring circuit are individually sensitive to red and blue light, and the visual indicating means in the other measuring circuit are individually sensitive to red and green light.

* * * * *